(12) United States Patent
Stamps et al.

(10) Patent No.: US 7,867,096 B2
(45) Date of Patent: Jan. 11, 2011

(54) JOINT FOR TILTROTOR HUBS

(75) Inventors: Frank B. Stamps, Colleyville, TX (US);
James L. Braswell, Jr., Colleyville, TX (US);
Charles L. Baskin, Arlington, TX (US);
Joe J. Zierer, Harper, TX (US);
David A. Haynie, Euless, TX (US);
Richard E. Rauber, Arlington, TX (US);
Thomas C. Campbell, Keller, TX (US);
Patrick R. Tisdale, Roanoke, TX (US)

(73) Assignee: Textron Innovations Inc., Providence, RI (US)

( * ) Notice: Subject to any disclaimer, the term of this patent is extended or adjusted under 35 U.S.C. 154(b) by 489 days.

(21) Appl. No.: 11/916,009

(22) PCT Filed: Jun. 7, 2005

(86) PCT No.: PCT/US2005/019979

§ 371 (c)(1),
(2), (4) Date: Nov. 29, 2007

(87) PCT Pub. No.: WO2006/132636

PCT Pub. Date: Dec. 14, 2006

(65) Prior Publication Data

US 2009/0325718 A1    Dec. 31, 2009

(51) Int. Cl.
*F16D 3/08* (2006.01)
(52) U.S. Cl. .............................. 464/50; 464/72; 464/138
(58) Field of Classification Search .................. 464/50, 464/69, 71, 72, 138
See application file for complete search history.

(56) References Cited

U.S. PATENT DOCUMENTS

| 379,022 | A | * | 3/1888 | Morgan ..................... 464/71 X |
| 885,401 | A | | 4/1908 | Tadini |
| 1,707,530 | A | | 4/1929 | Meseroll |
| 2,939,300 | A | | 6/1960 | Lucia |
| 5,165,853 | A | | 11/1992 | Pancotti |

(Continued)

FOREIGN PATENT DOCUMENTS

GB    0143654    6/1920

(Continued)

OTHER PUBLICATIONS

Wagner, E. R., "Basic Requirements for Constant Velocity Universal Joints," Universal Joint and Driveshaft Design Manual, AE-7, Society of Automotive Engineers, Inc., Warendale, PA, pp. 99-101, TJ1079.S62 1979.*

(Continued)

*Primary Examiner*—Greg Binda
(74) *Attorney, Agent, or Firm*—James E. Walton

(57) ABSTRACT

A joint is configured for use with a rotary-wing aircraft having at least one engine. A driver is coupled to an output shaft of the engine, the driver being rotatable about an axis. A yoke is at least partially rotatable relative to the driver about a first center of rotation, the center of rotation being located on the axis. A plurality of upright links couple the yoke to the driver, each link being translatable relative to the yoke, the driver, or both. Each link is also rotatable relative to the yoke, the driver, or both, about a second center of rotation.

17 Claims, 12 Drawing Sheets

U.S. PATENT DOCUMENTS

| | | | |
|---|---|---|---|
| 5,186,686 A * | 2/1993 | Staples et al. | 464/69 |
| 6,019,578 A | 2/2000 | Hager et al. | |
| 6,030,177 A | 2/2000 | Hager | |
| 6,296,444 B1 | 10/2001 | Schellhase et al. | |
| 6,607,357 B2 | 8/2003 | Caramaschi | |
| 6,695,254 B2 | 2/2004 | Zoppitelli et al. | |
| 6,712,313 B2 | 3/2004 | Zoppitelli et al. | |

FOREIGN PATENT DOCUMENTS

| | | | |
|---|---|---|---|
| GB | 143654 | * | 6/1920 |
| JP | 2001130494 A | | 5/2001 |
| JP | 2002337796 A | | 11/2002 |

OTHER PUBLICATIONS

Office Action from Corresponding Canadian Application No. 2,610,853 dated Feb. 23, 2010.

* cited by examiner

JOINT FOR TILTROTOR HUBS

TECHNICAL FIELD

The present invention relates generally to the field of torque-transfer devices and relates particularly to joints for rotary-wing aircraft.

DESCRIPTION OF THE PRIOR ART

Designs of rotors and propellers for aircraft are often extremely complex. A large number of factors must be taken into account, including flexure of the rotor under heavy loads and the required motions of the rotor blades with respect to the drive mechanism. The considerations for prop-rotors, used as both propellers and rotors in aircraft such as a tiltrotor aircraft, can be more complex than usual. A tiltrotor aircraft 11 having three-blade prop-rotors 13A, 13B driven by engines carried in nacelles 15A, 15B, respectively, is shown in FIG. 1.

The advent of the tiltrotor aircraft has added performance requirements to the hub assembly, resulting from the more complex operation of the craft. The prop-rotor systems on a tiltrotor are very large by comparison with standard aircraft, and size becomes an issue. In some designs of a tiltrotor aircraft, particularly suitable for use in light and medium duty models, certain design choices must be made in order that there is room provided for all of the required parts.

Standard rotor-hub designs are relatively large, influencing the design of mechanical systems associated with the rotor. For example, a large rotor hub requires a relatively long mast. The hub itself is heavy, and associated systems, such as the control rods, are relatively long and heavy. Systems must be designed to prevent interference with the control system.

Joints must be provided between the driveshaft that carries torque from the engine and the yoke that drives the blades, giving rise to a relatively complex hub assembly. An example of such an assembly used in 3-bladed prop-rotors is described in U.S. Pat. No. 4,804,352 and show as assembly 16 in an exploded view in FIG. 2. A drive hub 17 has a splined opening for fixedly receiving driveshaft 19, and drive hub 17 is connected through pivoting linkage to a hub (not shown) that carries the blades of the prop-rotor. The pivoting linkage comprises three pairs of members, each pair having a link 21 and clevis 23. Each end of links 21 has a spherical laminated elastomeric bearing, with the leading-end bearing of each link 21 being connected to hub 17 and the trailing-end bearing of each link 21 being connected to a clevis 23. Clevises 23 are connected to the hub (not shown), providing a path for torque to be transferred from driveshaft 19 into drive hub 17, though drive hub 17 into links 21, through links 21 into clevises 23, and through clevises 23 into the hub for driving the blades. Though joint assembly 16 provides adequate torque-transfer capability for use with a three-blade prop-rotor and torque output of engines currently being used, the system will not support the required increase in engine torque and/or in the rotational inertia of the prop-rotor for future configurations of tiltrotors.

SUMMARY OF THE INVENTION

It would be desirable to provide a joint that is suitable for use with the design constraints of a prop-rotor aircraft and that supports increased torque demands. The joint must provide proper support for the blades while remaining small compared to prior-art designs.

Therefore, it is an objective of the present invention to provide a joint with the capability to handle increased torque input and/or an increase in rotational inertia of the prop-rotor, such as with a prop-rotor having four or more blades.

The above objects are achieved by providing a joint with the capability to handle increased torque input and/or an increase in rotational inertia of the prop-rotor, such as with a prop-rotor having four or more blades.

A joint is configured for use with a rotary-wing aircraft having at least one engine. A driver is coupled to an output shaft of the engine, the driver being rotatable about an axis. A yoke is at least partially rotatable relative to the driver about a first center of rotation, the center of rotation being located on the axis. A plurality of upright links couple the yoke to the driver, each link being translatable relative to the yoke, the driver, or both. Each link is also rotatable relative to the yoke, the driver, or both, about a second center of rotation.

The present invention provides a joint with many advantages, including: (1) providing the ability to transfer increased torque between an engine and a prop-rotor of an aircraft; and (2) limiting the size of the joint to reduce the size of the prop-rotor hub assembly.

Additional objectives, features, and advantages will be apparent in the written description that follows.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which.

DESCRIPTION OF THE PREFERRED EMBODIMENT

The present invention is an improved joint for a prop-rotor assembly of a tiltrotor aircraft, the joint being configured for transferring torque from a driveshaft operably connected to an engine of the aircraft to a yoke for rotating the yoke and prop-rotor blades attached to the yoke. The joint comprises links that allow for the yoke to be tilted relative to the driveshaft while maintaining the delivery of torque to the prop-rotor. The links are elongated and are oriented with their length being generally parallel to the axis of rotation of the driveshaft to allow for more links to be packaged in the same space than the number of links able to be included in prior-art designs.

To allow for limited relative rotation of components of the joint of the invention, spherical and radial bearings are used. While any suitable bearings will suffice, it is preferred that the bearings are laminated elastomeric bearings, as know in the art, which comprise alternating layers of a rigid material and an elastomeric material bonded to each other. For example, a common pairing of materials is to have metal layers alternating with rubber layers. These bearings are configured to provide very limited compressibility in directions along any radius of curvature, while allowing for limited rotational and/or translational movement of the layers relative to each other through elastic deformation of the elastomeric layers in a shear direction.

Figure 3:
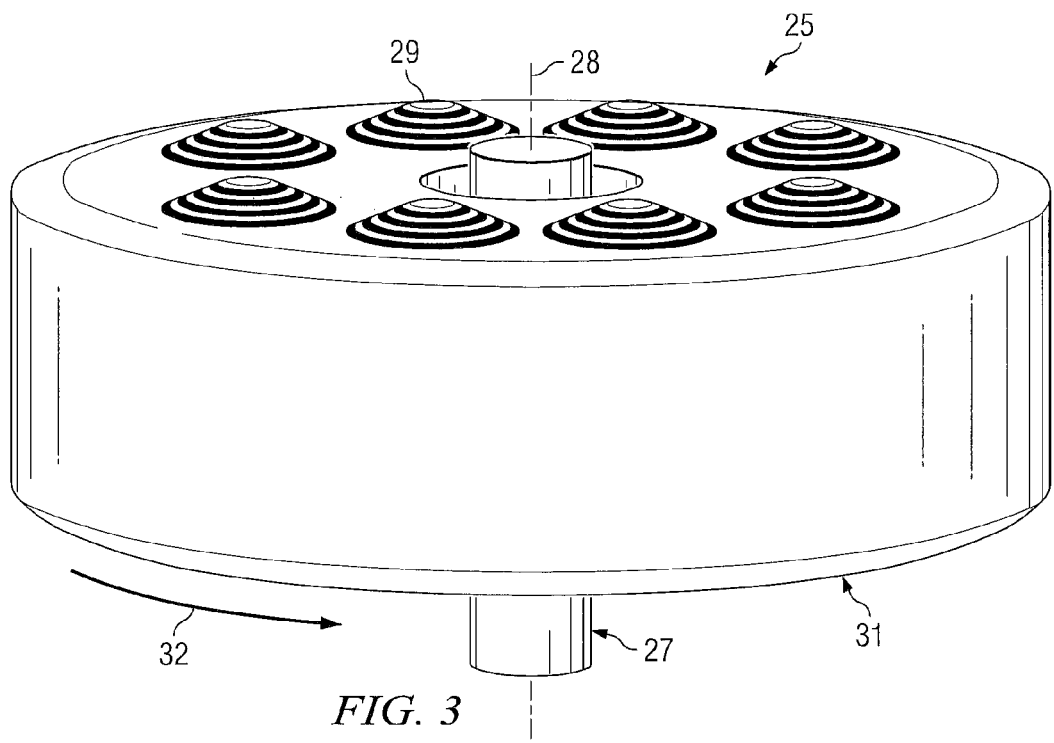
FIG. 3 is a perspective view of a joint according to the present invention.

FIGS. 3 through 8 illustrate a preferred embodiment of a joint 25 according to the present invention. FIG. 3 is a perspective view of joint 25 that shows a mast 27 that is operably connected to an output shaft of an engine (not shown) of a tiltrotor aircraft, such that torque produced by the engine causes rotation of mast 27 about axis of rotation 28. Mast 27 is connected by a plurality of rigid, upright links 29 to a driven member, or yoke 31, which is operably connected to prop-rotor blades (not shown), allowing mast 27 to drive yoke 31 and the attached blades for producing thrust needed for flight of the aircraft. In the embodiment shown in the figures, joint 25 is configured for rotation in the direction shown by arrow 32, though joint 25 may alternatively be configured for rotation in the opposite direction. Also, the embodiment shown has eight links 29 connecting mast 27 to yoke 31, though joint 25 may alternatively be configured to have more or fewer links 29. For example, fewer links 29 may be used when the requirement is to reduce the size and/or mass of joint 25, and more links 29 may be used to provide for additional torque-transfer capability or for other packaging reasons.

Figure 4:
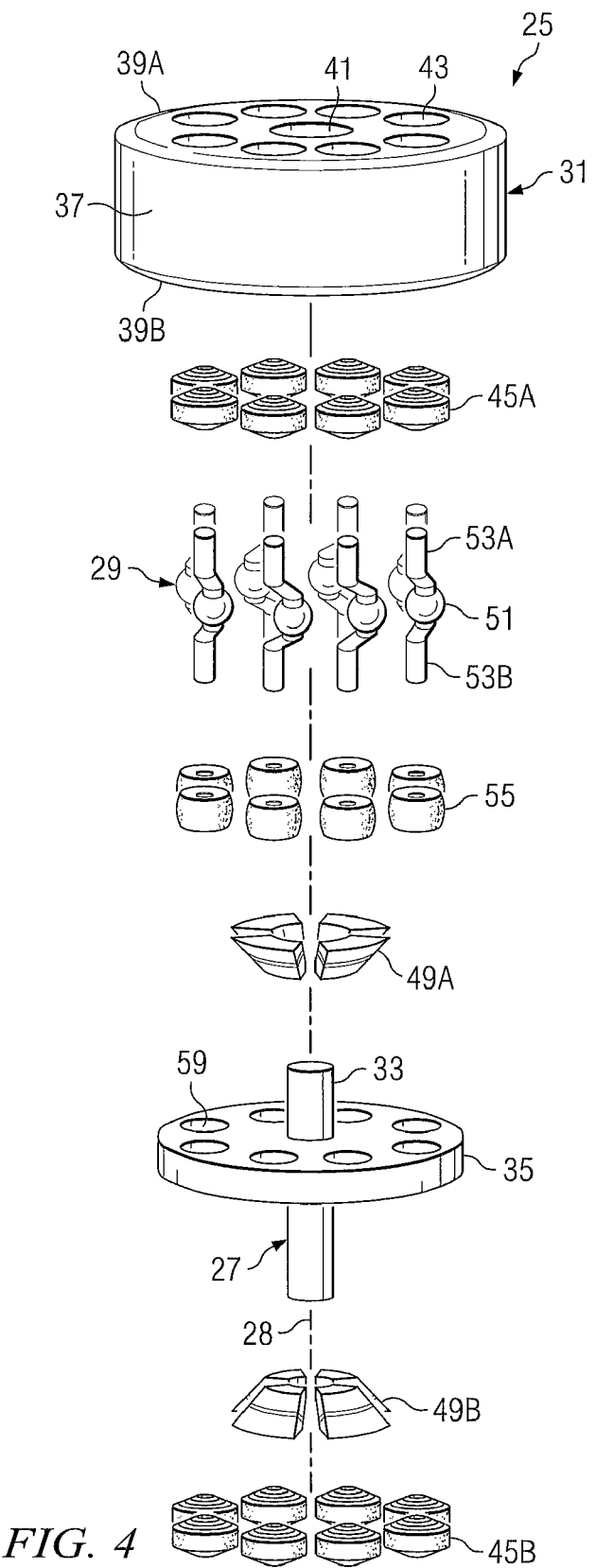
FIG. 4 is an exploded perspective view of the joint of FIG. 3.

FIG. 4 is an exploded perspective view of joint 25. Mast 27 comprises a shaft 33 and a disk-shaped driver, or disk 35, affixed to shaft 33 for rotation with shaft 33. Disk 35 and shaft 33 may be formed together as integral parts of mast 27 or may be formed separately and then connected. The connection of shaft 33 and disk 35 may be permanent, such as by welding, or may be of a type that allows disk 35 to be removed from shaft 33, such as with the use of splines or similar types of connections. A splined or similar connection may also allow for movement, if desired, of joint 25 axially along shaft 33.

Yoke 31 is a rigid member comprising a cylindrical side wall 37 and upper and lower bearing plates 39A, 39B. Side wall 37 and plates 39A, 39B form an enclosure that houses disk 35 of mast 27 when joint 25 is assembled, and yoke 31 is typically formed as two or more parts that are assembled to form yoke 31. Plates 39A, 39B each have a central aperture 41 through which shaft 33 of mast 27 protrudes into and through yoke 31. Each bearing plate 39A, 39B also has an array of radial-bearing pockets 43 sized for receiving upper and lower radial bearings 45A, 45B, respectively.

Yoke 31 is configured for limited rotation relative to mast 27 about a center of rotation at bearing focus 47 (shown in FIGS. 6 and 7), which is preferably located on axis of rotation 28 of shaft 33. Bearing focus 47 is the focus of upper spherical bearings 49A and lower spherical bearings 49B that connect mast 27 to yoke 31. Spherical bearings 49A, 49B are preferably laminated spherical bearings, though other suitable bearings may be used. One end of each spherical bearing 49A, 49B is connected to mast 27, and the other end of each bearing 49A, 49B is connected to an inner surface of bearing plate 39A, 39B, respectively. Apertures 41 of yoke 31 are sized to have a larger diameter than that of shaft 33, allowing for lateral displacement of apertures 41 relative to shaft 33 as yoke 31 rotates about focus 47.

Figure 5:
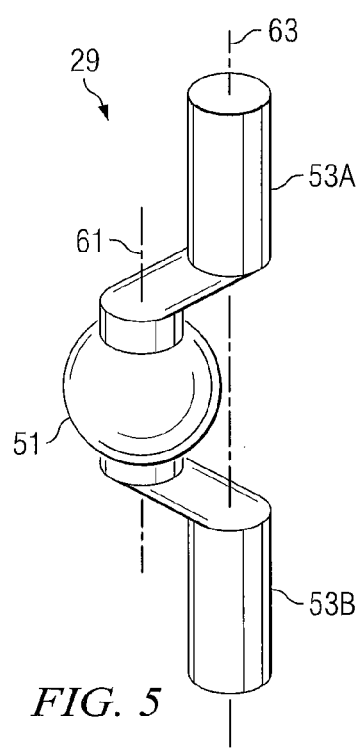
FIG. 5 is a perspective view of one link of the joint of FIG. 3.

Referring also to FIG. 5, each link 29 is a rigid member having a leading coupler 51 and preferably two trailing couplers 53A, 53B, though one or more of links 29 may be configured to have only one trailing coupler 53A, 53B. Though leading coupler 51 is shown as being spherical in shape, other suitable configurations may be used. Likewise, though trailing couplers 53A, 53B are shown as being cylindrical, other suitable configurations may be used. Each leading coupler 51 cooperates with a corresponding spherical bearing 55 to allow link 29 to rotate relative to disk 35 about a center of rotation at bearing focus 57 (FIGS. 7 and 8), which is preferably located at the center of leading coupler 51. Disk 35 has an array of spherical bearing pockets 59 sized to carry spherical bearings 55. Spherical bearings 55 also allow links 29 to rotate a limited amount relative disk 35 about an axis of rotation 61. Radial bearings 45A, 45B allow trailing portions 53A, 53B, respectively, to rotate a limited amount relative to yoke 31 about an axis of rotation 63.

Figure 6:
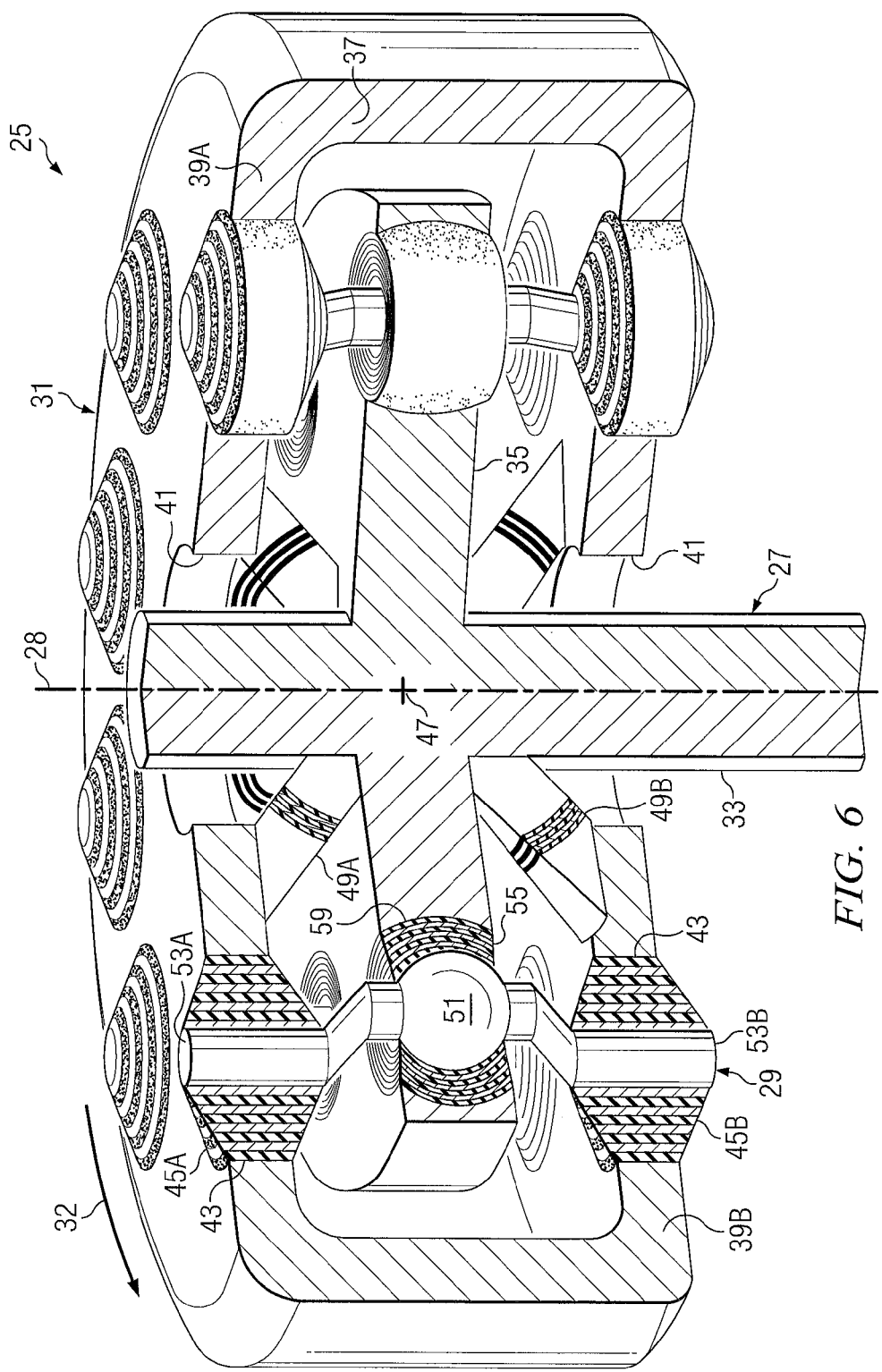
FIG. 6 is a perspective view of the joint of FIG. 3, a portion of the joint being cutaway to show inner portions of the joint.
Figure 7:
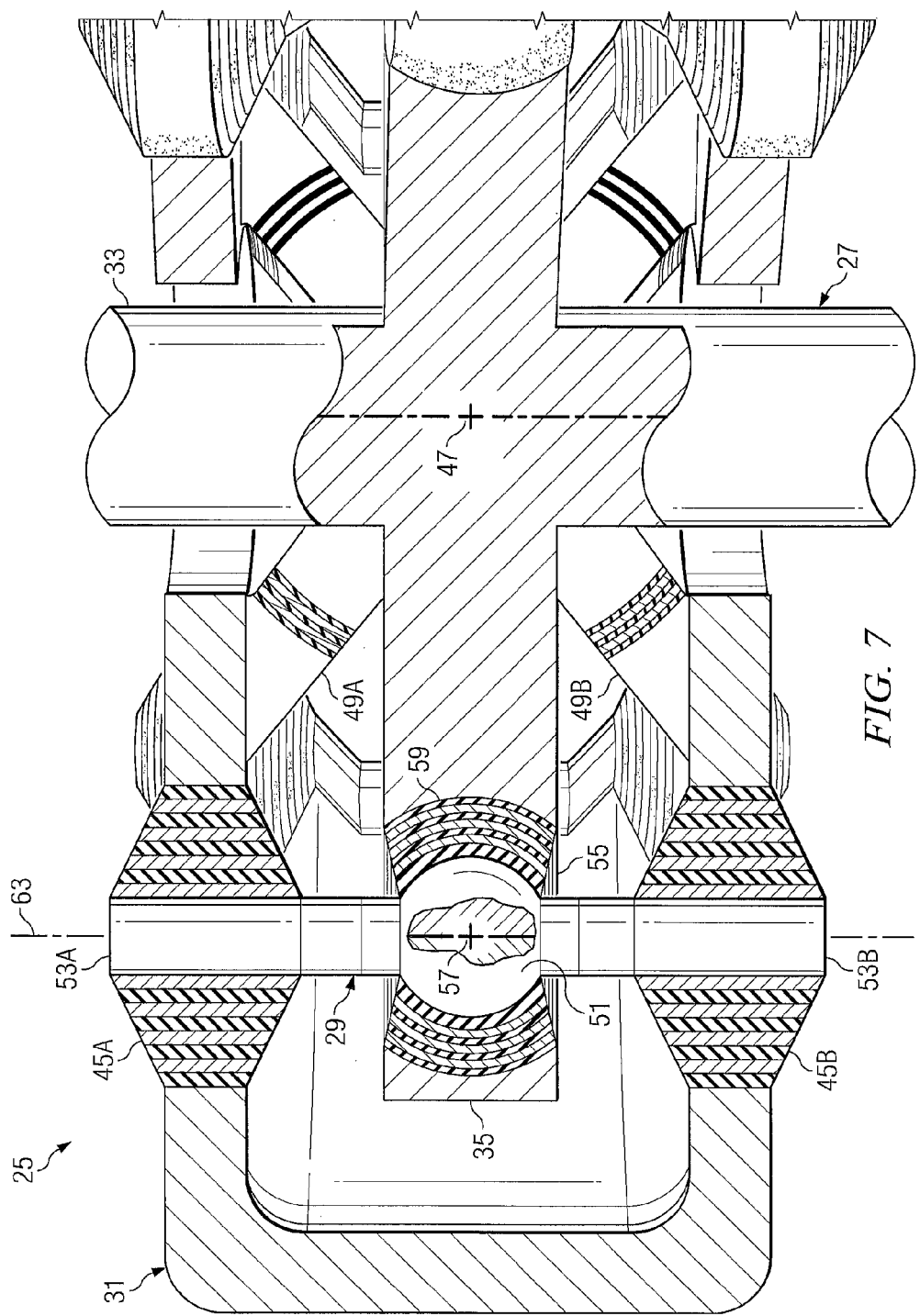
FIG. 7 is a partial sectional view of the joint of FIG. 3 with the yoke in an unperturbed, nominal position.
Figure 8:
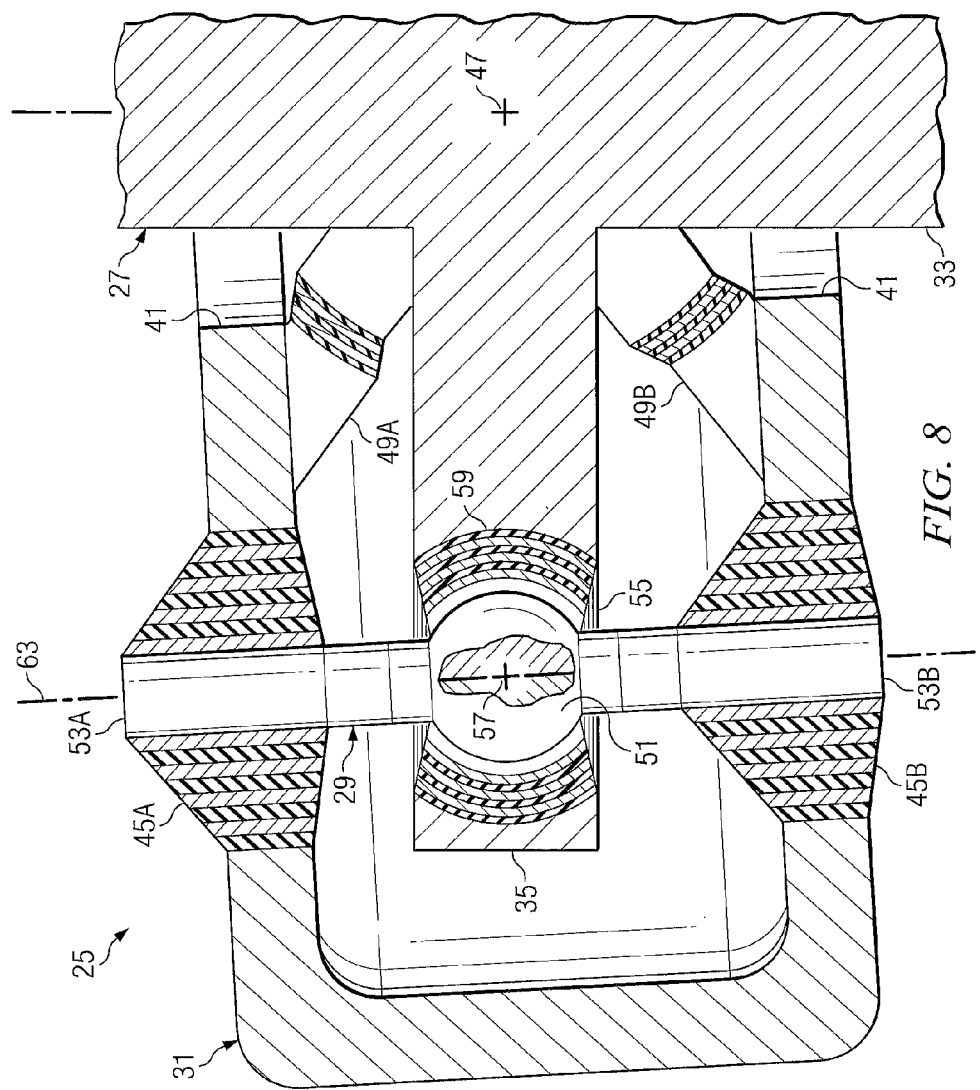
FIG. 8 is a partial sectional view of the joint of FIG. 3 with the yoke in a perturbed position.

Referring now to FIGS. 6 through 8, joint 25 is shown in a perspective view, with a portion of joint 25 removed to show inner detail of the assembly. As described above, shaft 33 of mast 27 extends through apertures 41 of plates 39A, 39B, and disk 35 is located within the interior of yoke 31. In FIGS. 6 and 7, joint 25 is shown in an unperturbed, nominal position, in which shaft 33 is approximately centered in apertures 41 and disk 35 is approximately centered both vertically and horizontally within yoke 31. FIG. 8 shows joint 25 perturbed from the nominal position, as will occur as flapping loads are transferred from blades (not shown) into yoke 31 and yoke 31 rotates relative to mast 27 about focus 47.

Figure 1:
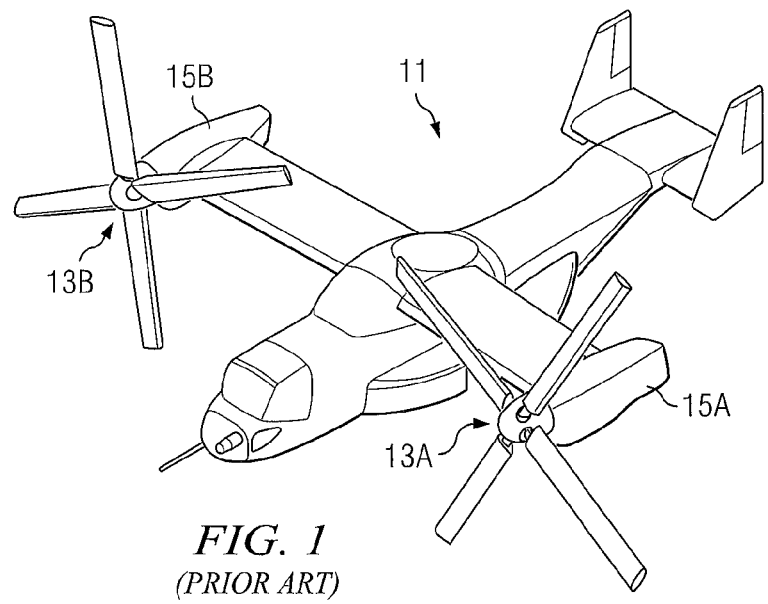
FIG. 1 is a perspective view of a tiltrotor aircraft having a prior-art joint.
Figure 2:
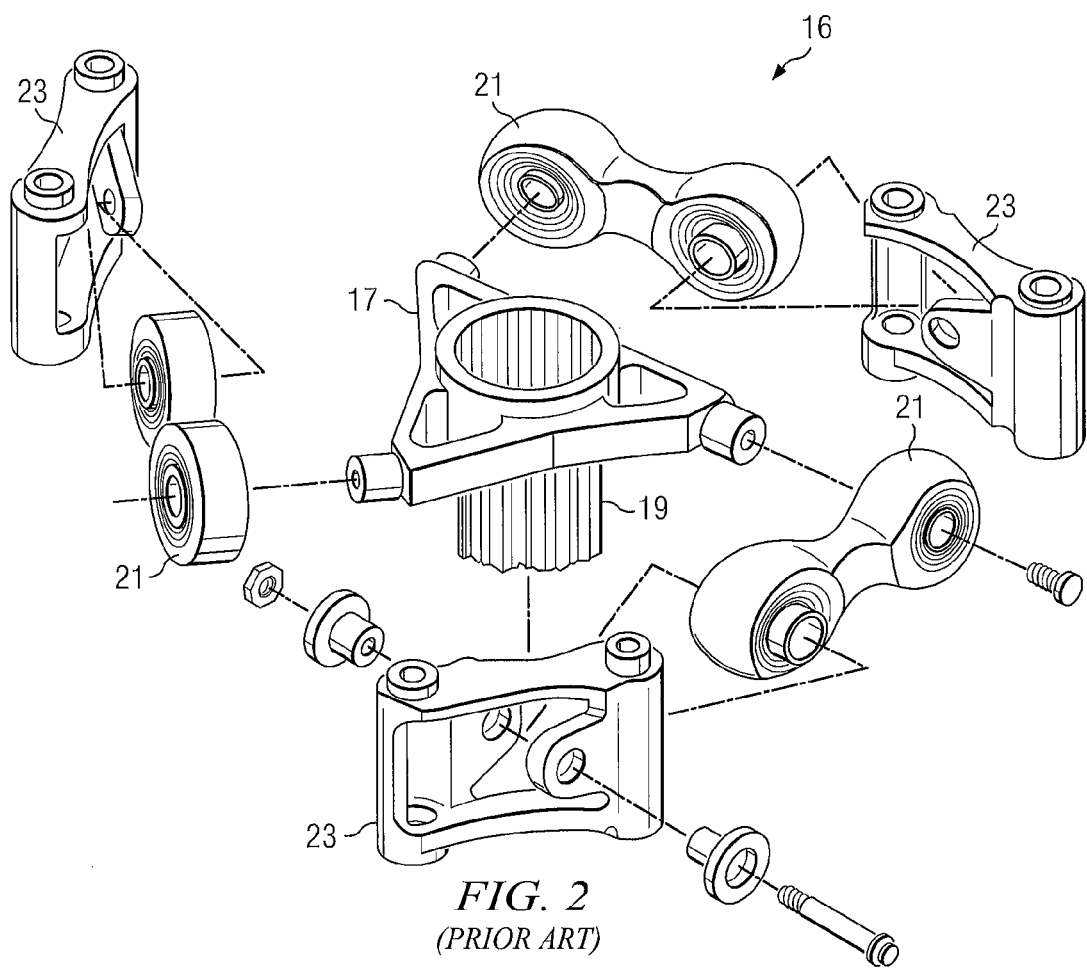
FIG. 2 is an exploded perspective view of the prior-art joint of the aircraft of FIG. 1.

Yoke 31 and disk 35 are rotationally oriented about axis 33 to position radial-bearing pockets 43 in a trailing position relative to spherical-bearing pockets 59 and the direction of rotation shown by arrow 32. This orientation aligns pockets 43 for receiving trailing couplers 53A, 53B, when leading coupler 51 of each link 29 is located within bearing pocket 59. For each link 29, the outer spherical surface of leading coupler 51 is fixedly connected to the inner spherical surface of spherical bearing 55, and the outer spherical surface of bearing 55 is fixedly connected to the inner spherical surface of bearing pocket 59. Thus, each link 29 is rotatable relative to disk 35 about focus 57 (FIGS. 7 and 8) for a limited amount through elastic deformation of the elastomeric layers of spherical bearing 55. Rotation is allowed about horizontal axes in the plane of disk 35, as well as about vertical axis 61 (FIG. 2).

Likewise, for each link 29, the outer cylindrical surface of trailing coupler 53A, 53B is fixedly connected to the inner cylindrical surface of radial bearing 45A, 45B, respectively, and the outer cylindrical surface of each radial bearing 45A, 45B is fixedly connected to the inner cylindrical surface of the corresponding radial-bearing pocket 43. Each link is rotatable a limited amount about axis 63 (FIG. 2) relative to yoke 31 through elastic deformation of the elastomeric layers of bearing 45. In addition to rotation about axis 63, bearings 45A, 45B allows for a limited amount of translation of trailing couplers 53A, 53B and the inner layers of radial bearings 45A, 45B along axis 63 relative to yoke 31 through elastic deformation of the elastomeric layers of bearings 45A, 45B. This type of relative movement is shown in FIG. 8 and described below.

Up and down flapping motion of blades attached to yoke 31 causes vertical loads to be transferred to yoke 31, and these loads are dissipated through rotation of yoke 31 about focus 47 and the resulting elastic deformation of elastomeric layers of spherical bearings 49A, 49B, 55 and of radial bearings 45A, 45B. FIG. 8 shows a portion of yoke 31, with yoke 31 rotated about focus 47 approximately 3 degrees downward from the nominal position shown in FIG. 7. As yoke 31 rotates on spherical bearings 49A, 49B, bearings 49A, 49B are elastically deformed as the outer ends of bearings 49A, 49B are moved with yoke 31.

As the outward portions of yoke 31 move up or down relative to link 29, radial bearings 45A, 45B are elastically deformed axially as the outer layers of bearings 45A, 45B move with yoke 31. The inner layers of bearings 45A, 45B are stretched from the nominal positions relative to the outer portions shown in FIG. 7 to positions such as those shown in FIG. 8. As yoke 31 rotates, link 29 is rotated about focus 57 due to trailing couplers 53A, 53B being acted on by radial bearings 45A, 45B, respectively. Rotation of link 29 also elastically deforms spherical bearing 55 through rotation of leading coupler 51 relative to disk 35 of mast 27. Since the inner portion of bearing 55 is fixedly connected to coupler 51, the inner portions of bearing 55 are rotated in the direction of rotation of link 29. The elastic deformation of spherical bearings 49A, 49B, 55 and radial bearings 45A, 45B opposes and damps the motion of yoke 31 relative to mast 27, preventing undamped oscillations of yoke 31 about focus 47.

One of the advantages of joint 25 is the ability to package many more torque-transfer members, such as links 29, within a small enclosure for increasing the amount of torque that can be transferred between mast 27 and yoke 31. In the embodiment shown in FIGS. 3 through 8, joint 25 has eight links 29, though more or fewer links 29 may be used, as is suitable for the application.

Figure 9:
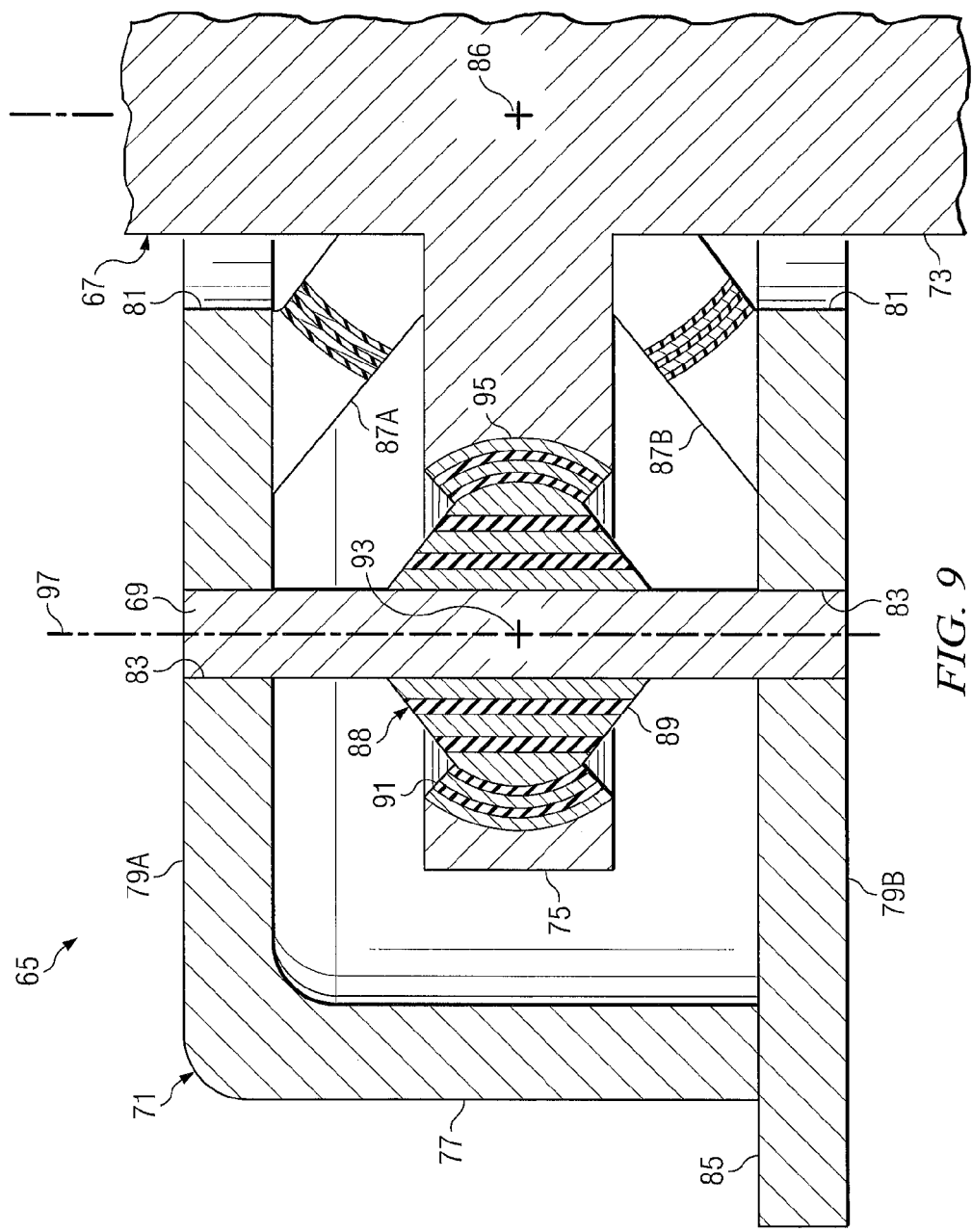
FIG. 9 is a partial sectional view of an alternative embodiment of a joint according to the present invention.
Figure 10:
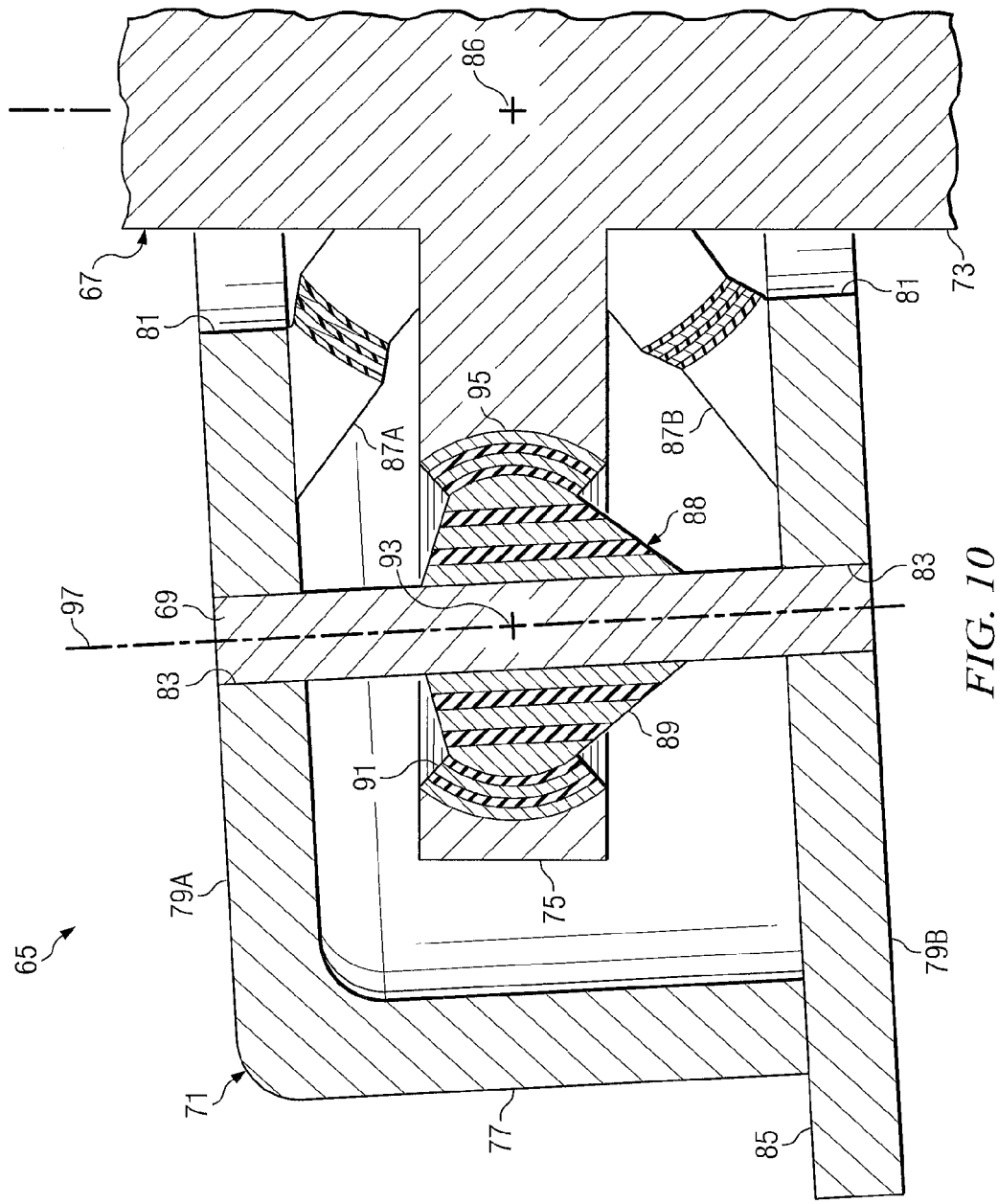
FIG. 10 is a partial sectional view of the joint of FIG. 9 with the yoke in a perturbed position.

FIGS. 9 and 10 show a partial sectional view of an alternative embodiment of the joint of the invention. Many components of joint 65 are constructed similarly to joint 25, described above. Joint 65 has a mast 67 operably connected to an output shaft of an engine (not shown) of a tiltrotor aircraft for rotating mast 67. Mast 67 is connected by a plurality of rigid, upright links 69 to a yoke 71, which is operably connected to prop-rotor blades (not shown), allowing mast 67 to drive yoke 71 and the attached blades for producing thrust needed for flight of the aircraft. In the embodiment shown in the figures, joint 65 is configured for rotation in either direction.

Mast 67 comprises a shaft 73 and a disk-shaped driver, or disk 75, affixed to shaft 73 for rotation with shaft 73. Disk 75 and shaft 73 are shown as integral parts of mast 67, though they may alternatively be formed separately and then connected. The connection of shaft 73 and disk 75 may be permanent, such as by welding, or may be of a type that allows disk 75 to be removed from shaft 73, such as with the use of splines or similar types of connections. A splined or similar connection may also allow for movement, if desired, of joint 65 axially along shaft 73.

Yoke 71 is a rigid member comprising a cylindrical side wall 77 and upper and lower plates 79A, 79B. Side wall 77 and plates 79A, 79B form an enclosure that houses disk 75 when joint 65 is assembled, and yoke 71 is shown as having been formed as two parts that are assembled to form yoke 71. Plates 79A, 79B each have a central aperture 81 through which shaft 73 of mast 67 protrudes into and through yoke 71. Each plate 79A, 79B also has an array of apertures 83 sized for fixedly receiving upper and lower ends of link 69. Lower plate 79B is shown as having a radial extension 85 configured for attachment of prop-rotor blades.

Yoke 71 is configured for limited rotation relative to mast 67 about a center of rotation at bearing focus 86 of upper spherical bearings 87A and lower spherical bearings 87B that connect mast 27 to yoke 31. Spherical bearings 87A, 87B are preferably laminated spherical bearings, though other suitable bearings may be used. One end of each spherical bearing 87A, 87B is connected to mast 67, and the other end of each bearing 87A, 87B is connected to an inner surface of plate 79A, 79B, respectively. Apertures 81 of yoke 71 are sized to have a larger diameter than that of shaft 73, allowing for lateral displacement of apertures 81 relative to shaft 73 as yoke 71 rotates about focus 86.

Each link 69 is preferably a straight, rigid, cylindrical member, though links 69 may be configured to have other cross-sectional shapes and/or to have leading and trailing portions like those of link 29, described above. The ends of each link 69 are fixedly received in apertures 83 of plates 79A, 79B, and links 69 move with yoke 71 as yoke 71 rotates relative to mast 67. A combination bearing 88, which comprises a radial bearing 89 and a spherical bearing 91, connects each link 69 to disk 75 and allows link 69 to move relative to disk 35. Spherical bearings 91 allow links 69 to rotate about a center of rotation at bearing focus 93 and about axis 97, if necessary, whereas radial bearings 89 allow link 69 to translate along axis 97 relative to disk 75. Disk 75 has a plurality of spherical bearing pockets 95 arrayed around disk 75 and sized to carry combination bearings 88.

FIG. 9 shows joint 65 in an unperturbed, nominal position, in which shaft 73 is centered in apertures 81 and disk 75 is approximately centered both vertically and horizontally within yoke 71. FIG. 10 shows joint 65 perturbed from the nominal position, as will occur as flapping loads are transferred from blades (not shown) into yoke 71 and yoke 71 rotates relative to mast 67 about the focus of bearings 85A, 85B.

For each link 69, the outer cylindrical surface is fixedly connected to the inner cylindrical surface of radial bearing 89, and the outer spherical surface of spherical bearing 91 is fixedly connected to the inner spherical surface of bearing pocket 95. Thus, each link 69 is rotatable relative to disk 35 about focus 93 for a limited amount through elastic deformation of the elastomeric layers of spherical bearing 91. In addition, the outer cylindrical surface of each end of each link 69 is fixedly connected to the cylindrical inner surface of apertures 83 in plates 79A, 79B. Radial bearings 89 allow for a limited amount of translation of link 69 along axis 97 relative to disk 75 through elastic deformation of the elastomeric layers of radial bearing 89. These relative movements are shown in FIG. 10 and described below.

Up and down flapping motion of blades attached to yoke 71 causes vertical loads to be transferred to yoke 71, and these loads are dissipated through rotation of yoke 71 about focus 86 and the elastic deformation of elastomeric layers of spherical bearings 87A, 87B, 91 and radial bearings 89. FIG. 10 shows a portion of yoke 71, yoke 71 being rotated about focus 86 approximately 3 degrees downward from the nominal position shown in FIG. 9. As yoke 71 rotates on spherical bearings 87A, 87B, bearings 87A, 87B are elastically deformed as the outer ends of bearings 87A, 87B are moved with yoke 71.

As yoke 71 rotates about focus 86, the outward portions of yoke 71 move up or down relative to disk 75. Because the ends of link 29 are affixed in apertures 83 of yoke 71, link 69 moves with yoke 71, with link 69 rotating and translating relative to disk 75. The translation of link 69 elastically deforms radial bearing 89 along axis 97 as the inner layers of bearing 89 move with link 69, stretching bearing 89 from the nominal positions shown in FIG. 9. Also, the rotation of link 69 elastically deforms spherical bearing 91. The elastic deformation of spherical bearings 87A, 87B, 91 and radial bearing 89 opposes and damps the motion of yoke 71 relative to mast 67, preventing undamped oscillations of yoke 71 about focus 67.

Figure 11:
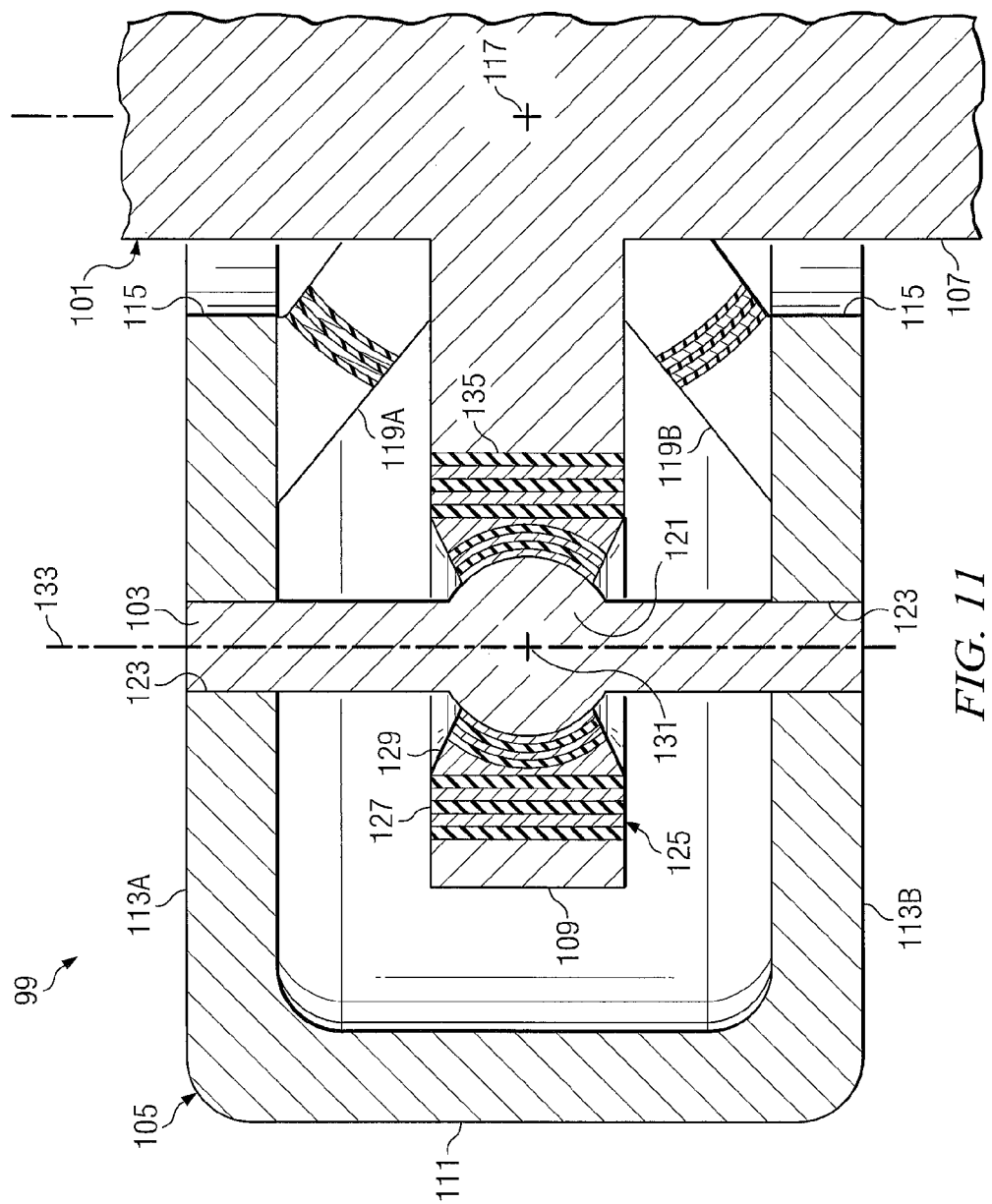
FIG. 11 is a partial sectional view of a second alternative embodiment of a joint according to the present invention.
Figure 12:
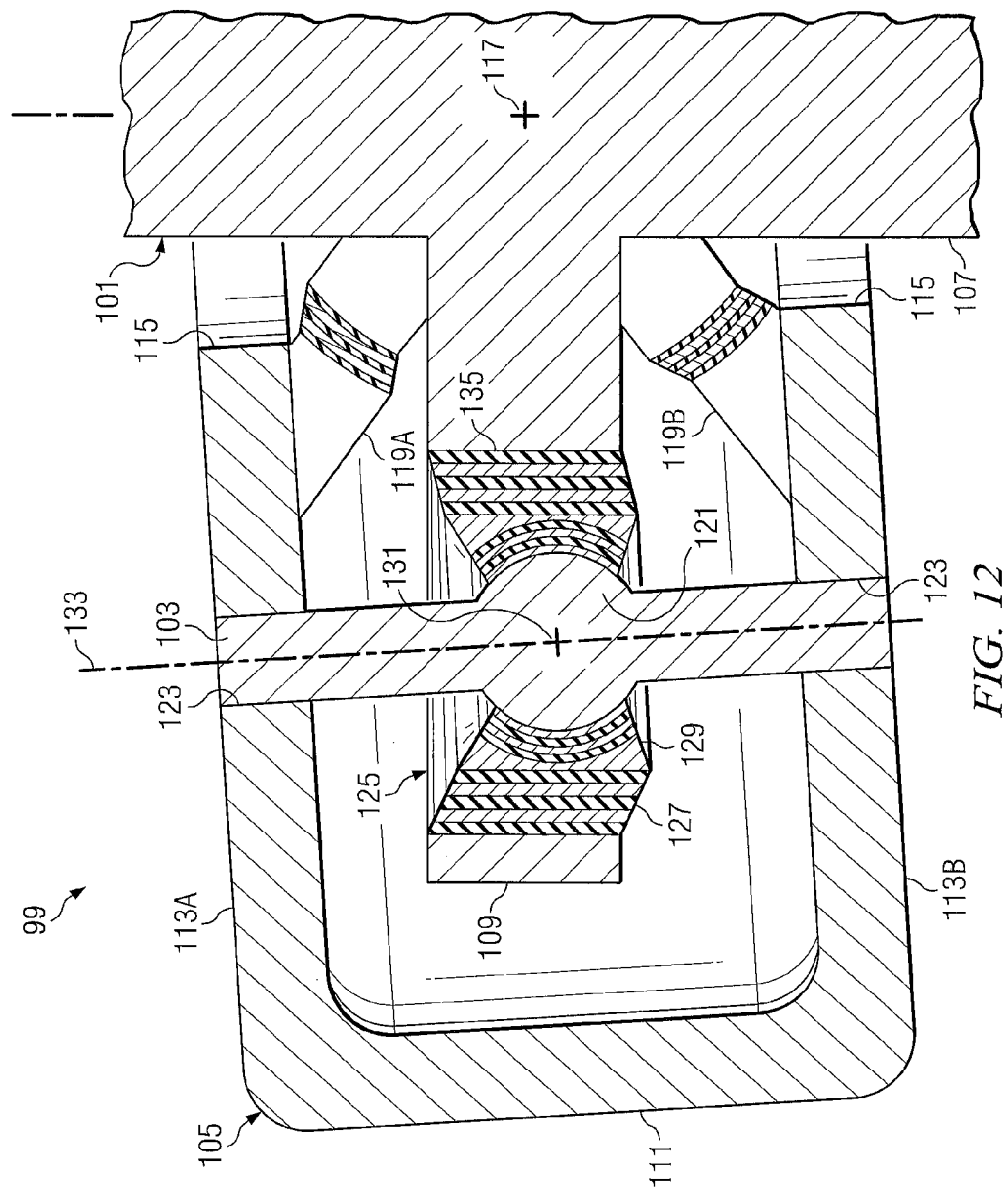
FIG. 12 is a partial sectional view of the joint of FIG. 11 with the yoke in a perturbed position.

FIGS. 11 and 12 show a partial sectional view of an alternative embodiment of the joint of the invention. Many components of joint 99 are constructed similarly to joint 65, described above, though the configuration of the combination bearing is reversed. Joint 99 has a mast 101 operably connected to an output shaft of an engine (not shown) of a tiltrotor aircraft for rotating mast 101. Mast 101 is connected by a plurality of rigid, upright links 103 to a yoke 105, which is operably connected to prop-rotor blades (not shown), allowing mast 101 to drive yoke 105 and the attached blades for producing thrust needed for flight of the aircraft. In the embodiment shown in the figures, joint 99 is configured for rotation in either direction.

Mast 101 comprises a shaft 107 and a disk-shaped radial driver, or disk 109, affixed to shaft 107 for rotation with shaft 107. Disk 109 and shaft 107 are shown as integral parts of mast 101, though they may alternatively be formed separately and then connected. As described for previous embodiments, the connection of shaft 107 and disk 109 may be permanent, such as by welding, or may be of a type that allows disk 109 to be movable relative to shaft 107, such as with the use of splines or similar types of connections.

Yoke 105 is a rigid member comprising a cylindrical side wall 111 and upper and lower plates 113A, 113B. Side wall 111 and plates 113A, 113B form an enclosure that houses disk 109 when joint 99 is assembled, and yoke 105 is preferably formed as two parts that are assembled to form yoke 105. Plates 113A, 113B each have a central aperture 115 through which shaft 107 of mast 101 protrudes into and through yoke 105. Each plate 113A, 113B also has an array of apertures 123 sized for fixedly receiving upper and lower ends of link 103.

Yoke 105 is configured for limited rotation relative to mast 101 about a center of rotation at bearing focus 117 of upper spherical bearings 119A and lower spherical bearings 119B that connect mast 101 to yoke 105. Spherical bearings 119A, 119B are preferably laminated spherical bearings, though other suitable bearings may be used. One end of each spherical bearing 119A, 119B is connected to mast 101, and the other end of each bearing 119A, 119B is connected to an inner surface of plate 113A, 113B, respectively. Apertures 115 of yoke 105 are sized to have a larger diameter than that of shaft 101, allowing for lateral displacement of apertures 115 relative to shaft 107 as yoke 105 rotates about focus 117.

Each link 103 is preferably a rigid cylindrical member having a spherical portion 121, though links 69 may be configured to have other cross-sectional shapes and/or to have leading and trailing portions like those of link 29, described above. The ends of each link 103 are fixedly received in apertures 123 of plates 113A, 113B, and links 103 move with yoke 105 as yoke 105 rotates relative to mast 101. A combination bearing 125, which comprises a radial bearing 127 and a spherical bearing 129, connects each link 103 to disk 109 and allows link 103 to move relative to disk 109. Spherical bearings 129 allow links 103 to rotate about a center of rotation at bearing focus 131 and about axis 133, if necessary, whereas radial bearings 127 allow link 103 to translate along axis 133 relative to disk 109. Disk 109 has a plurality of cylindrical bearing pockets 135 arrayed around disk 109 and sized to carry combination bearings 125.

FIG. 11 shows joint 99 in an unperturbed, nominal position, in which shaft 107 is approximately centered in apertures 115 and disk 109 is approximately centered vertically and horizontally within yoke 105. FIG. 12 shows joint 99 perturbed from the nominal position, as will occur as flapping loads are transferred from blades (not shown) into yoke 105 and yoke 105 rotates relative to mast 101 about focus 117.

For each link 103, the outer spherical surface of spherical portion 121 is fixedly connected to the inner spherical surface of spherical bearing 129, and the outer cylindrical surface of radial bearing 127 is fixedly connected to the inner cylindrical of bearing pocket 135. Thus, each link 103 is rotatable relative to disk 109 about focus 131 for a limited amount through elastic deformation of the elastomeric layers of spherical bearing 129. In addition, the outer cylindrical surface of each end of each link 103 is fixedly connected to the inner cylindrical surface of apertures 123 in plates 113A, 113B. Radial bearings 127 allow for a limited amount of translation of link 103 along axis 133 relative to disk 109 through elastic deformation of the elastomeric layers of radial bearing 127. These relative movements are shown in FIG. 12 and described below.

Up and down flapping motion of blades attached to yoke 105 causes vertical loads to be transferred to yoke 105, and these loads are dissipated through rotation of yoke 105 about focus 117 and the elastic deformation of elastomeric layers of spherical bearings 119A, 119B, 129 and radial bearings 127. FIG. 12 shows a portion of yoke 105, yoke 105 being rotated about focus 117 approximately 3 degrees downward from the nominal position shown in FIG. 11. As yoke 105 rotates on spherical bearings 119A, 119B, bearings 119A, 119B are elastically deformed as the outer ends of bearings 119A, 119B are moved with yoke 105.

As yoke 105 rotates about focus 117, the outward portions of yoke 105 move up or down relative to disk 109. Because the ends of link 103 are affixed in apertures 123 of yoke 105, link 103 moves with yoke 105, with link 103 rotating and translating relative to disk 109. The translation of link 103 elastically deforms radial bearing 127 along axis 133 as the inner layers of bearing 125 move with link 103, stretching bearing 125 from the nominal positions shown in FIG. 11. Also, the rotation of link 103 elastically deforms spherical bearing 129. The elastic deformation of spherical bearings 119A, 119B, 129 and radial bearing 127 opposes and damps the motion of yoke 105 relative to mast 101, preventing undamped oscillations of yoke 103 about focus 117.

Figure 13:
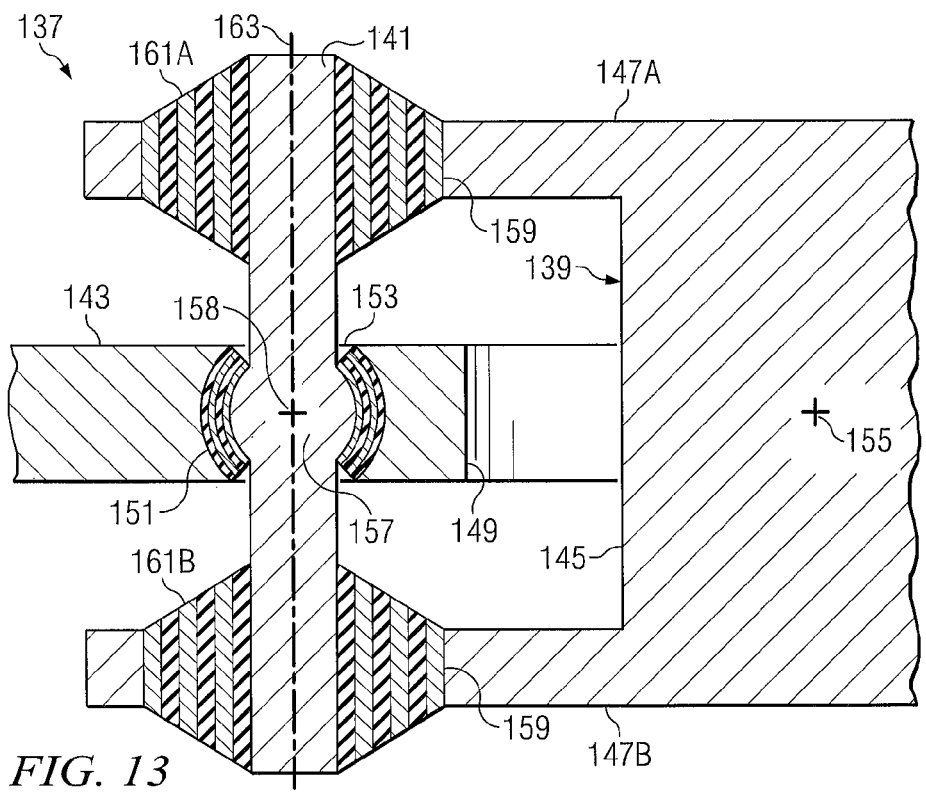
FIG. 13 is a partial sectional view of a third alternative embodiment of a joint according to the present invention.
Figure 14:
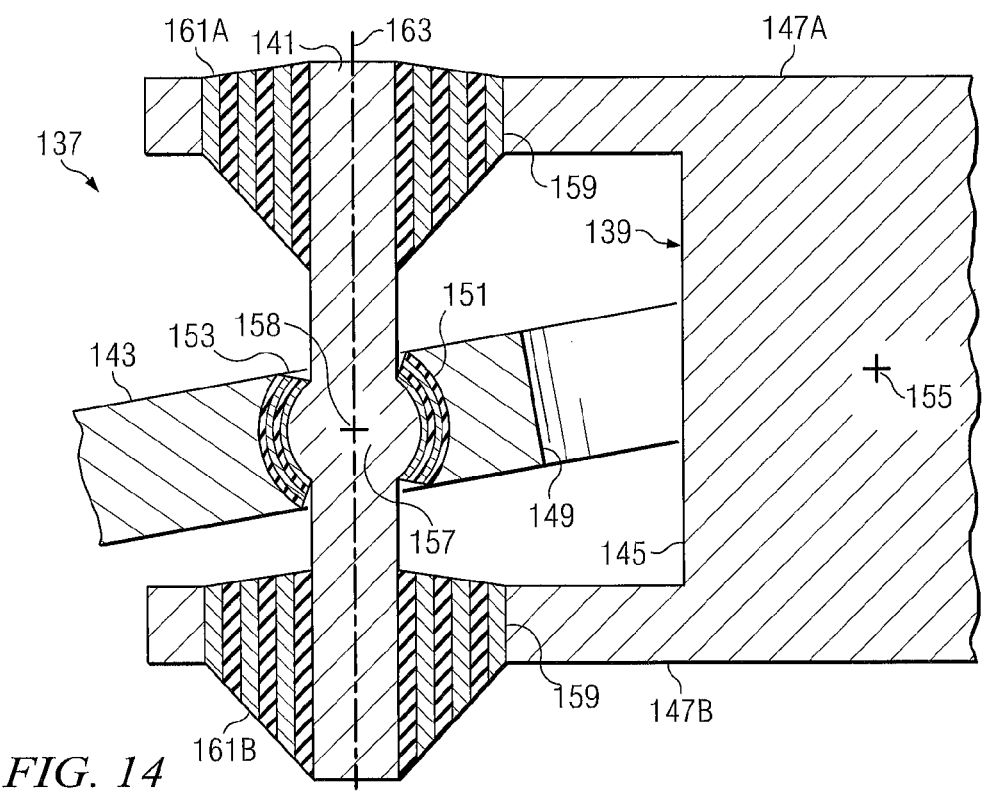
FIG. 14 is a partial sectional view of the joint of FIG. 13 with the yoke in a perturbed position.

FIGS. 13 and 14 show a partial sectional view of another alternative embodiment of the joint of the invention. Joint 137 has a mast 139 operably connected to an output shaft of an engine (not shown) of a tiltrotor aircraft for rotating mast 139. Mast 139 is connected by a plurality of rigid, upright links 141 to a disk-shaped yoke 143, which is operably connected to prop-rotor blades (not shown), allowing mast 139 to drive yoke 143 and the attached blades for producing thrust needed for flight of the aircraft. In the embodiment shown in the figures, joint 137 is configured for rotation in either direction.

Mast 139 comprises a shaft 145 and disk-shaped upper and lower plates 147A, 147B affixed to shaft 145 for rotation with shaft 145. Plates 147A, 147B and shaft 145 are shown as integral parts of mast 139, though they may alternatively be formed separately and then connected using any appropriate method, including those described above for other embodiments.

Yoke 143 is a rigid member and has a central cylindrical aperture 149 through which shaft 145 of mast 139 protrudes. Yoke 143 also has a plurality of spherical bearing pockets 151 arrayed around yoke 143 and sized for receiving a spherical bearing 153, and the outer spherical surface of bearing 153 is fixedly attached to the inner spherical surface of pocket 151. Yoke 143 is configured for limited rotation relative to mast 139 about a focus 155, which is a bearing focus of spherical bearings (not shown) that connect yoke 143 to mast 139. Aperture 149 of yoke 143 is sized to have a larger diameter than that of shaft 145, allowing for rotation of aperture 149 relative to shaft 145 as yoke 143 rotates about focus 155.

Each link 141 is preferably a rigid cylindrical member having a central spherical portion 157, though links 141 may be configured to have other cross-sectional shapes and/or to have leading and trailing portions like those of link 29, described above. Each spherical bearing 153 is configured for receiving spherical portion 157, the outer surface of which is fixedly attached to the spherical inner surface of bearing 153. Link is rotatable relative to yoke 143 about a canter of rotation at bearing focus 158. In an alternative embodiment, link 141 may be configured like link 29 (FIG. 5), described above, such that the ends of link 141 are leading portions, and spherical portion 157 are trailing portions.

Plates 147A, 147B each have cylindrical radial bearing pockets 159 arrayed around plates 147A, 147B and sized for receiving radial bearings 161A, 161B. The outer cylindrical surface of each bearing 161A, 161B is fixedly attached to the inner cylindrical surface of the associated pocket 159. Each bearing 161A, 161B is sized for receiving one of the ends of one of links 141, and the cylindrical surface of each end of link 141 is fixedly attached to the inner cylindrical surface of the associated bearing 161A, 161B. Radial bearings 161A, 161B allow for translation of links 141 relative to plates 147A, 147B along axis 163 as yoke 143 rotates about focus 155.

FIG. 13 shows joint 137 in an unperturbed, nominal position, in which shaft 145 is approximately centered in apertures 149 and yoke 143 is approximately centered vertically between plates 147A, 147B. FIG. 14 shows joint 137 perturbed from the nominal position, as will occur as flapping loads are transferred from blades (not shown) into yoke 143 and yoke 143 rotates relative to mast 139 about focus 155.

Each link 141 is rotatable relative to yoke 143 about focus 158 for a limited amount through elastic deformation of the elastomeric layers of the associated spherical bearing 153. In addition, each link 141 is translatable for a limited amount along axis 163 relative to yoke 143 through elastic deformation of the elastomeric layers of radial bearings 161A, 161B. These relative movements are shown in FIG. 14 and described below.

Up and down flapping motion of blades attached to yoke 143 causes vertical loads to be transferred to yoke 143, and these loads are dissipated through rotation of yoke 143 about focus 155 and the elastic deformation of elastomeric layers of spherical bearings 153 and radial bearings 161A, 161B. FIG. 14 shows a portion of yoke 143, yoke 143 being rotated about focus 155 approximately 10 degrees downward from the nominal position shown in FIG. 13.

As yoke 143 rotates about focus 155, the outward portions of yoke 143 move up or down relative to disk plates 147A, 147B. Because spherical portions 157 of links 141 are affixed in spherical bearings 161A, 161B, link 141 moves with yoke 143. During this movement, yoke 143 rotates relative to link 141, and link 141 translates relative to plates 147A, 147B. The translation of link 141 elastically deforms radial bearings 161A, 161B along axis 163 as the inner layers of bearings 161A, 161B move with link 141, stretching bearings 161A, 161B from the nominal positions shown in FIG. 13. Also, the rotation of yoke 143 relative to link 141 elastically deforms spherical bearing 153. The elastic deformation of spherical bearings 153 and radial bearings 161A, 161B opposes and damps the motion of yoke 143 relative to mast 139, preventing undamped oscillations of yoke 143 about focus 155.

Figure 15:
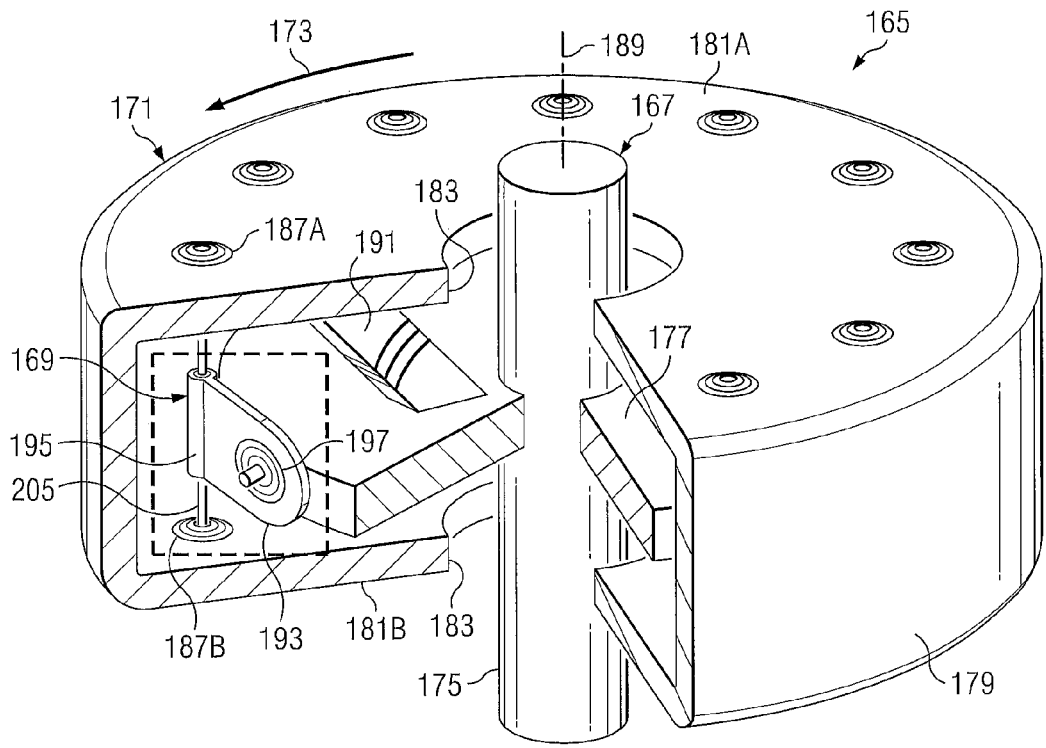
FIG. 15 is a perspective view of a fourth alternative embodiment of a joint according to the present invention, a portion of the joint being cutaway to show inner portions of the joint.
Figure 16:
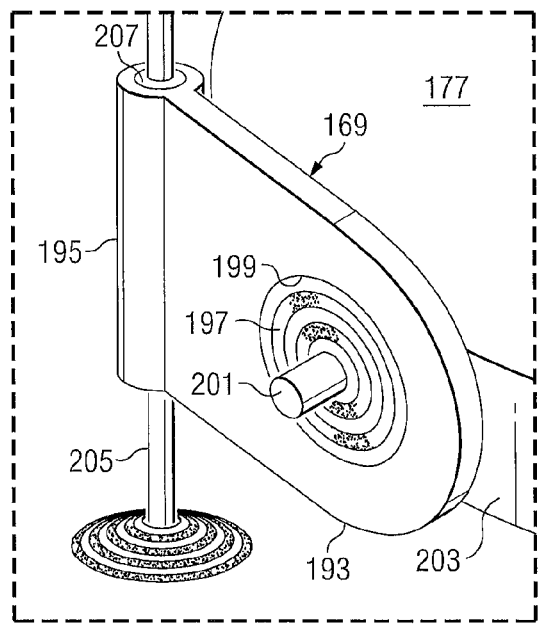
FIG. 16 is a partial perspective view of a disk and link of the joint of FIG. 15.

FIGS. 15 and 16 show another alternative embodiment of the joint of the invention. FIG. 15 is a perspective view of the joint, a section being removed to reveal inner portions, and FIG. 16 is a partial view of a portion of the joint. Joint 165 has a mast 167 operably connected to an output shaft of an engine (not shown) of a tiltrotor aircraft for rotating mast 167. Mast 167 is connected by a plurality of rigid, upright links 169 to a yoke 171, which is operably connected to prop-rotor blades (not shown), allowing mast 167 to drive yoke 171 and the attached blades for producing thrust needed for flight of the aircraft. In the embodiment shown in the figures, joint 165 is configured for rotation in the direction shown by arrow 173, though joint 165 may alternatively be configured for rotation in the opposite direction.

Mast 167 comprises a shaft 175 and a disk-shaped radial driver, or disk 177, affixed to shaft 175 for rotation with shaft 175. Disk 177 may be integrally formed with shaft 175 or may alternatively be formed separately and then attached to shaft 175. As described for previous embodiments, the connection of shaft 175 and disk 177 may be permanent, such as by welding, or may be of a type that allows disk 177 to be movable relative to shaft 175, such as with the use of splines or similar types of connections.

Yoke 171 is a rigid member constructed similarly to yoke 31, described above, and comprising a cylindrical side wall 179 and upper and lower bearing plates 181A, 181B. Side wall 179 and plates 181A, 181B form an enclosure that houses disk 177 of mast 167 when joint 165 is assembled, and yoke 171 is typically formed as two or more parts that are assembled to form yoke 171. Plates 181A, 181B each have a central aperture 183 through which shaft 175 protrudes into and through yoke 171. Each bearing plate 181A, 181B also has an array of radial-bearing pockets 185 sized for receiving upper and lower radial bearings 187A, 187B, respectively. Radial bearings 187A, 187B are preferably laminated, elastomeric bearings like those described above for other embodiments.

Yoke 171 is configured for limited rotation relative to mast 167 about a center of rotation at a bearing focus (not shown), which is preferably located on axis of rotation 189 of shaft 175. The bearing focus is the focus of upper and lower (not shown) spherical bearings 191 that connect mast 167 to yoke 171. Spherical bearings 191 are preferably laminated spherical bearings, though other suitable bearings may be used. Apertures 183 of yoke 171 are sized to have a larger diameter than that of shaft 175, allowing for lateral displacement of apertures 183 relative to shaft 175 as yoke 171 rotates about the bearing focus of bearings 191.

Referring now specifically to FIG. 16, each link 169 is a rigid member having a leading coupler 193 and a trailing coupler 195. Though leading coupler 193 is shown as being planar, other suitable configurations may be used. Likewise, though trailing coupler 195 is shown as being cylindrical, other suitable configurations may be used. Each leading coupler 193 cooperates with a corresponding spherical bearing 197 to allow link 169 to rotate relative to disk 177 about a center of rotation at the bearing focus of spherical bearing 197. Each link has a spherical bearing pocket 199 in leading coupler 193 that is sized for receiving laminated spherical bearing 197. Cylindrical connectors extend radially from the outer cylindrical wall 203 of disk 177 and are sized to be received in a central aperture of bearings 197. This configuration allows for torque to be transferred from disk 177 into each connector 201, then from connector 201 into link 169 through spherical bearing 197.

Trailing coupler 195 comprises a shaft 205 that extends in a direction generally parallel to axis 189 (FIG. 15). In the embodiment shown, shaft 205 is not translatable relative to trailing coupler 195, though shaft 205 is preferably rotatable relative to trailing coupler 195 and may be supported by one or more bearing 207 within trailing coupler 195 for allowing rotation.

Referring again to FIG. 15, in the embodiment shown, the ends of each shaft 205 are fixedly attached to the inner surface of associated radial bearings 187A, 187B. Radial bearings 187A, 187B allow yoke 171 to translate relative to links 169 as yoke rotates about the bearing focus of spherical bearings 191. As yoke 171 rotates, radial bearings 187A, 187B are elastically deformed as yoke 171 moves relative to shaft 205. As yoke 171 moves, link 169 is rotated relative to connector 201 about the bearing focus of spherical bearing 197, elastically deforming the elastomeric layers of bearing 197.

Though not shown, a second version of joint 165 has links 169 in which shaft 205 is translatable relative to trailing coupler 195. This eliminates the need for radial bearings 187A, 187B. In this embodiment, the ends of shaft 205 are preferably fixedly attached to apertures in yoke 171, and bearings 207 of trailing couplers 195 would preferably be laminated radial bearings.

The present invention provides a joint with many advantages, including: (1) providing the ability to transfer increased torque between an engine and a prop-rotor of an aircraft; and (2) limiting the size of the joint to reduce the size of the prop-rotor hub assembly.

While this invention has been described with reference to an illustrative embodiment, this description is not intended to be construed in a limiting sense. Various modifications and other embodiments of the invention will be apparent to persons skilled in the art upon reference to the description.

The invention claimed is:

1. A joint for a rotary-wing aircraft having at least one engine, the joint comprising:
   a driver adapted to be coupled to an output shaft of the at least one engine, the driver being rotatable about an axis;
   a yoke at least partially rotatable relative to the driver about a first center of rotation, the center of rotation being located on the axis; and
   a plurality of upright links coupling the yoke to the driver, each link being translatable relative to at least one of the yoke and the driver;
   wherein at least one link has a leading coupler and a trailing coupler that is not coaxial with the leading coupler, each coupler coupling the link to one of the yoke and the driver;
   wherein the leading coupler is rotatable about a leading coupler axis, the trailing coupler rotatable about a trailing coupler axis, the trailing coupler axis and the leading coupler axis being offset and approximately parallel to each other, the leading coupler axis and the trailing coupler axis also being approximately parallel to the axis associated with rotation of the driver.

2. The joint according to claim 1, wherein the at least one link has a leading coupler and two trailing couplers, the trailing couplers being located on opposite sides of the leading coupler.

3. The joint according to claim 1, wherein each link is coupled to at least one of the yoke and the driver with a laminated elastomeric bearing.

4. The joint according to claim 1, wherein each link is at least partially rotatable and at least partially translatable relative to the driver.

5. The joint according to claim 1, wherein each link is at least partially rotatable relative to the driver and at least partially translatable relative to the yoke.

6. The joint according to claim 1, wherein each link is at least partially rotatable relative to the yoke and at least partially translatable relative to the driver.

7. A joint for a rotary-wing aircraft having at least one engine, the joint comprising:
   a driver adapted to be coupled to an output shaft of the at least one engine, the driver having an axis of rotation;
   a yoke at least partially rotatable relative to the driver about a first center of rotation located on the axis; and
   a plurality of upright links coupling the yoke to the driver, each link having at least one leading coupler coupled to the driver and two trailing couplers located on opposite sides of the corresponding leading coupler, the trailing couplers being coupled to the yoke;
   wherein each leading coupler is at least partially rotatable relative to the driver about a second center of rotation;
   wherein the two trailing couplers are offset from the each leading coupler, such that the second center of rotation associated with each leading coupler is offset from a geometric axis of each trailing coupler; and
   wherein each trailing coupler is at least partially translatable relative to the yoke.

8. The joint according to claim 7, wherein each trailing coupler is spaced from the corresponding leading coupler.

9. The joint according to claim 7, wherein each leading coupler is coupled to the driver with a spherical bearing having a bearing focus located at the second center of rotation.

10. The joint according to claim 7, wherein each trailing coupler is coupled to the yoke with a radial bearing.

11. A joint for a rotary-wing aircraft having at least one engine, the joint comprising:
   a driver adapted to be coupled to an output shaft of the at least one engine, the driver having an axis of rotation;
   a yoke at least partially rotatable relative to the driver about a first center of rotation located on the axis; and
   a plurality of upright links coupling the yoke to the driver, each link having at least one leading coupler coupled to the driver and two trailing couplers located on opposite sides of the corresponding leading coupler, the trailing couplers being coupled to the yoke;
   wherein each leading coupler is at least partially translatable relative to the driver;
   wherein the two trailing couplers are offset from the each leading coupler, such that a first geometric axis associated with each leading coupler is offset from a second geometric axis associated with each trailing coupler; and
   wherein each trailing coupler is at least partially rotatable relative to the yoke about a second center of rotation.

12. The joint according to claim 11, wherein each leading coupler is spaced from the two trailing couplers.

13. The joint according to claim 11, wherein each leading coupler is coupled to the driver with a spherical bearing.

14. The joint according to claim 11, wherein each trailing coupler is coupled to the yoke with a radial bearing having a bearing focus located at the second center of rotation.

15. A joint for a tiltrotor aircraft, the joint being configured for transferring torque from an output shaft of an engine to a prop-rotor assembly of the aircraft, the joint comprising:

a mast adapted to be operably associated with the output shaft, such that torque in the output shaft is transferred to the mast;

a plurality of upright links having a leading portion connected to the mast a radial distance from an axis of the mast, each link being at least partially rotatable relative to the mast about axes intersecting a center of rotation, each link also having at least one trailing portion extending from the leading portion, each trailing portion having an axis of translation offset from a parallel axis passing through the center of rotation; and a yoke connected to each trailing portion, such that each trailing portion is at least partially translatable relative to the yoke;

wherein tilting of the yoke relative to the mast about a flapping axis generally perpendicular to the axis of the mast causes rotation of each link relative to the mast about the corresponding center of rotation and causes translation of each trailing portion relative to the yoke.

16. The joint according to claim 15, wherein each leading portion has a spherical member, and wherein each spherical member is carried by the mast in a first spherical bearing having a bearing focus located at the corresponding center of rotation.

17. The joint according to claim 15, wherein each trailing portion has a section carried by the yoke in a radial bearing having a bearing axis parallel with the corresponding axis of rotation.

* * * * *